United States Patent [19]

Erkfritz

[11] 4,318,647
[45] Mar. 9, 1982

[54] ADJUSTABLE INSERT SEAT AND WEDGE ASSEMBLY FOR AN INDEXABLE BORING CUTTER

[75] Inventor: Donald S. Erkfritz, Clarkston, Mich.

[73] Assignee: General Electric Company, Columbus, Ohio

[21] Appl. No.: 138,197

[22] Filed: Apr. 7, 1980

[51] Int. Cl.³ .......................... B23B 51/00; B26D 1/12
[52] U.S. Cl. ...................................... 408/153; 407/45; 407/46; 407/49; 408/713
[58] Field of Search ................. 408/153, 713; 407/36, 407/37, 38, 39, 40, 41, 42, 43, 44, 45, 46, 47, 48, 49, 50, 51

[56] References Cited

U.S. PATENT DOCUMENTS

| | | | |
|---|---|---|---|
| 1,681,675 | 8/1928 | Miller | 407/36 |
| 3,162,929 | 12/1964 | Horne et al. | 407/36 |
| 3,315,332 | 4/1967 | Lowry et al. | 407/38 |
| 3,332,130 | 7/1967 | Armstrong | 407/44 |
| 3,339,257 | 9/1967 | Hargreaves et al. | 407/41 |
| 3,486,211 | 12/1969 | Greenleaf | 407/46 |
| 3,588,977 | 6/1971 | Bellingham et al. | 407/42 |
| 3,711,216 | 1/1973 | Zurcher | 408/153 |
| 3,739,442 | 6/1973 | Lovendahl | 407/37 |
| 3,788,625 | 1/1974 | Lindsay | 407/40 |
| 4,195,955 | 4/1980 | Lindsay | 407/40 |

Primary Examiner—Harrison L. Hinson
Attorney, Agent, or Firm—Hedman, Casella, Gibson & Costigan

[57] ABSTRACT

A boring cutter which is adapted to be rotated about its central axis includes at least one insert pocket having opposed parallel leading and trailing walls, as well as a bottom wall. An insert seat of generally L-shaped configuration is provided, with the leading surface of the insert seat being in abutting relationship with the leading wall of the pocket. The opposed trailing surface of the insert seat includes both a leading and rear locating support surface adapted to receive an indexable cutting insert. A wedge is receivable between the rear surface of the cutting insert and the trailing wall of the pocket. The radial position of both the insert seat and the wedge, relative to the central axis of the boring cutter is adjustable. By this arrangement, the radial position of the cutting insert may be varied to thereby adjust the effective outer diameter of the boring cutter. In addition, the amount of overhang, or the difference in the radial position between the cutting insert and the wedge, remains constant thereby maintaining the structural support for the cutting edge of the insert.

9 Claims, 5 Drawing Figures

ADJUSTABLE INSERT SEAT AND WEDGE ASSEMBLY FOR AN INDEXABLE BORING CUTTER

This invention relates to an adjustable insert seat and wedge assembly for a boring cutter. More specifically, an insert seat is provided which is receivable within the pocket of a boring cutter, adjacent the leading wall thereof. The insert seat includes a means to adjust the radial position of the insert seat relative to the central axis of the cutter. The insert seat further includes an L-shaped undercut which is adapted to receive an indexable cutting insert. By varying the radial position of the insert seat, the position of the insert is varied such that the effective outer diameter of the boring cutter is controlled. An adjustable wedge is provided which is adapted to be received between the rear planar surface of the insert and the trailing wall of the pocket. As a result of the cooperation between the insert seat, wedge, and the pocket walls, a constant overhang between the indexable insert and the wedge is maintained thereby supporting the insert which aids in preventing fracturing of its cutting edge.

BACKGROUND OF THE INVENTION

The subject invention provides for a new and improved boring cutter having a unique insert seat and wedge assembly which permits the outer diameter of the boring cutter to be readily adjusted. In addition, the desired overhang between the indexable insert and the wedge is maintained thereby reducing the likelihood of insert breakdown.

In the prior art, boring cutters are provided for machining metal parts made of cast iron, aluminum or steel. The prior art boring cutters are generally circular in configuration and are adapted to be rotated around a central axis. The cutters are provided with a plurality of insert pockets disposed around the periphery thereof, which are adapted to receive indexable cutting inserts, each insert having a plurality of sharpened cutting edges. In order to accurately locate and maintain the indexable cutting inserts within each pocket, various wedge assemblies have been employed which are mounted in the cutter pockets along with the inserts. The prior art wedge assemblies are removable since the exposed or active cutting edges of the inserts will become worn after a period of use such that the inserts must be rotated to expose a fresh sharpened cutting edge. Accordingly, the wedge assemblies are removable to enable the inserts to be indexed.

Heretofore, when utilizing random industry inserts, numerous difficulties arise when attempts are made to adjust the outer diameter of a milling cutter. The outer diameter is defined as the diameter of an imaginary circle which is coincident with the outermost end points or cutting edges of the insert. To enable the boring cutter to machine a part within the required tolerances, it is necessary that each of the cutting edges of the insert be accurately positioned to conform to the desired outer diameter. Thus, the radial position of the insert, relative to the central axis of the boring cutter must be accurately set and maintained. In addition, it is often desirable to change the outside diameter of a boring cutter to enable the cutter to act as a finisher, semi-finisher or rougher.

Heretofore, the desired outer diameter of the boring cutter was achieved by adding shims between the edge faces of the insert and the pocket of the boring cutter. More particularly, additional wedges or shims are placed between the insert and the pocket of the cutter to force the insert radially outwardly. To complete the fine adjustments necessary to produce an accurate and circular outer diameter, the boring cutter with inserts and shims mounted therein is spun ground until the proper diameter is achieved. Spin grinding is accomplished by placing the cutter on a mandrel between centers, and grinding the inserts until an accurate, circular outer diameter is obtained. The spin grinding of the boring cutter, to obtain the proper outer diameter, is both a difficult and time consuming procedure. Further, the use of shims, which are placed between the insert and the pocket of the boring cutter, increases the likelihood of insert breakdown. More specifically, as additional shims are added and the radial position of the insert is moved progressively outward, an increasingly larger portion of the insert is left unsupported. For example, in many prior art assemblies, a steel wedge is inserted between the trailing wall of the insert pocket and the carbide insert. In the latter arrangement, the amount which the carbide insert overhangs beyond the edge of the steel wedge is critical to the support of the cutting edge of the insert. As the insert is moved radially outwardly, a larger portion of the insert overhangs the wedge, and is thereby left unsupported which increases the likelihood of the fracturing of the insert. Thus, as noted above, as shims are used to control the outer diameter of the cutter, the overhang of the insert is increased which can lead to the fracture of the cutting edge of the insert.

Accordingly, it is an object of the subject invention to provide a new and improved adjustable insert seat and wedge assembly wherein the desired outer diameter of the boring cutter can be readily achieved by adjusting the radial position of the insert.

It is a further object of the subject invention to provide an adjustable insert seat and wedge assembly wherein the outer diameter of the boring cutter may be readily adjusted while maintaining the amount of overhang between the indexable insert and wedge thereby minimizing the likelihood of the fracturing of the cutting edge of the insert.

It is another object of the subject invention to provide an insert seat and wedge assembly which may be used to accurately fix the position of an indexable insert at the desired axial and radial rake angles.

It is still a further object of the subject invention to provide an adjustable insert seat and wedge assembly wherein the outer diameter of the boring cutter can be readily changed to accommodate various industry inserts such as utility inserts and press and treat inserts, and finishing inserts.

It is still another object of the subject invention to provide an insert seat and wedge assembly which enables a conventional fixed pocket boring cutter to be adapted for use as a rougher, finisher, or semi-finisher.

SUMMARY OF THE INVENTION

According to the present invention there is provided a new and improved adjustable insert seat and wedge assembly for use with a circular boring cutter. The boring cutter, which is intended to be rotated about its central axis, is provided with a plurality of pockets disposed in and opening out of the periphery thereof. Each insert pocket is provided with opposed parallel leading and trailing walls, as well as a bottom wall which is disposed perpendicular thereto. The terms "leading" and "trailing" as used in the art, are defined in relationship to the intended direction of rotation of the boring cutter with the leading surfaces preceding the trailing surfaces during a cutting operation.

The new and improved insert seat of the subject invention, which is adapted to be received within a pocket of the boring cutter, includes opposed leading and trailing surfaces. The leading surface of the insert seat is disposed in abutting relationship with the leading wall of the pocket. The opposed trailing surface of the insert seat is provided with an undercut portion such that the bit seat assumes a generally L-shaped configuration. The undercut portion of the trailing surface functions to define a leading locating support surface, as well as a rear locating support surface. The locating support surfaces act as the locating seat for the insert. A screw means is provided which is engaged with both the insert seat and the cutting tool such that upon rotation of the screw, the radial position of the insert seat relative to the central axis of the boring cutter may be adjusted.

The subject invention is intended for use with standard industry inserts having opposed front and rear planar surfaces, as well as edge faces disposed therebetween. The indexable insert is receivable in the insert seat such that the front planar surface thereof is in abutting relationship with the leading locating support while one of the edge faces of the insert is in abutting relationship with the rear locating support. Another edge face of the insert rests on the bottom wall of the pocket.

A wedge is provided which is adapted to be interfit between the rear surface of the insert and the trailing wall of the pocket. Another screw means is provided for adjusting the radial position of the wedge. By tightening the screw, the wedge is forced radially inwardly thereby locking the insert in the pocket between the wedge and the insert seat.

In use, to adjust the outer diameter of the boring cutter, the location of the insert seat is initially set by rotating the associated screw means thereby varying the radial position of the insert seat. This adjustment functions to affix the radial location of the insert since an edge face of the insert abuts the rear locating support of the insert seat. Thereafter, the wedge is adjusted radially inwardly until the insert is securely locked in place. Thus, a fast and simple method for adjusting the outer diameter of the boring cutter is provided. In addition, and as described more fully hereinafter, the relationship between the insert seat, insert and wedge, permits the accurate positioning of the wedge relative to the insert such that the overhang between the insert and the wedge is maintained, thereby reducing the likelihood of insert breakdown.

DESCRIPTION OF THE PREFERRED EMBODIMENT

Figure 2:
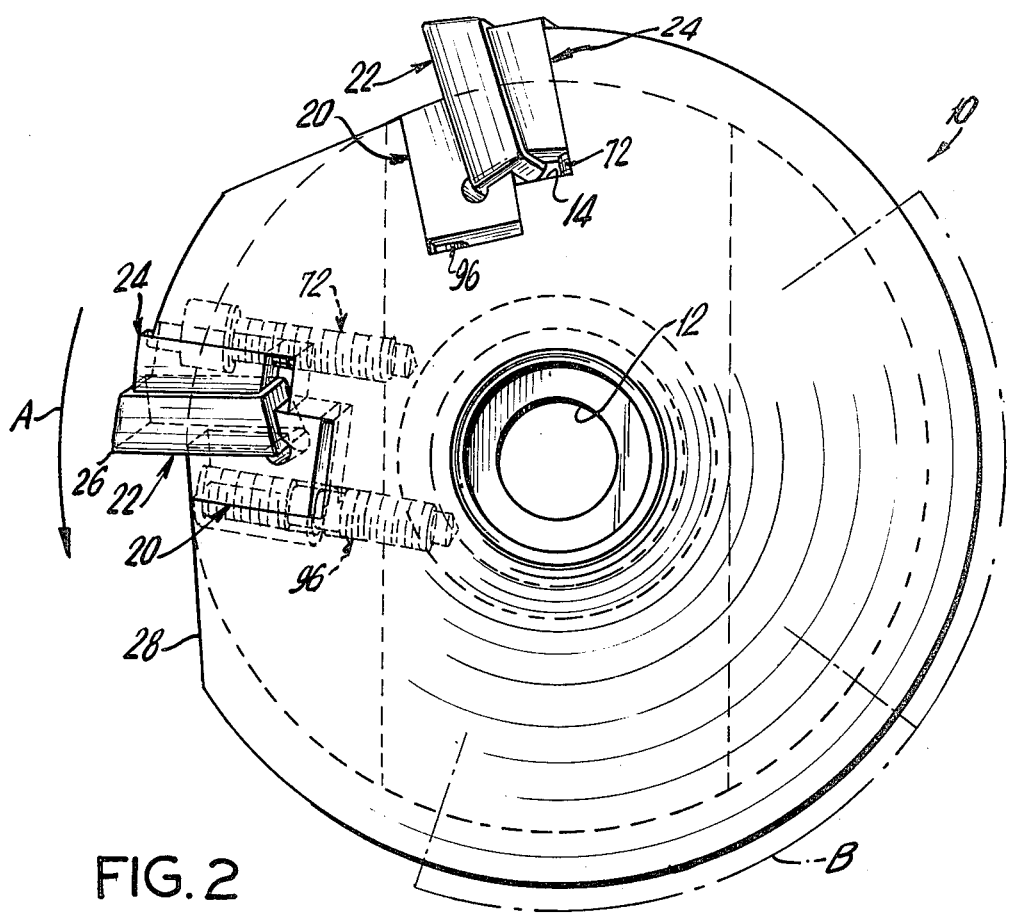
FIG. 2 is a top plan view of a boring cutter having a plurality of pockets and illustrating the insert seat and wedge assembly of the subject invention.
Figure 3:
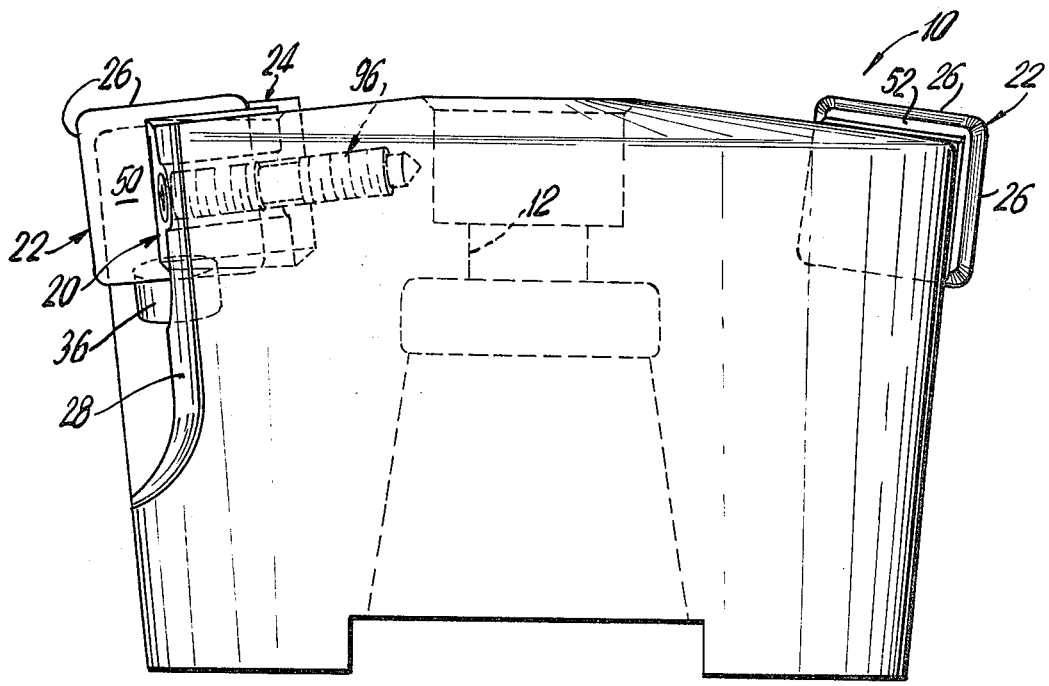
FIG. 3 is a side view of a boring cutter illustrating the insert seat and wedge assembly of the subject invention.

Turning more specifically to FIGS. 2 and 3, the insert seat and wedge assembly of the subject invention is intended for use in conjunction with a circular boring cutter, indicated generally by the numeral 10. The boring cutter 10 is provided with a central drive axis 12 about which the cutter may be rotated in the direction as indicated by arrow A in FIG. 2. Typically, a standard boring cutter will be provided with a plurality of insert pockets 14 which are symmetrically distributed about the periphery of the cutter 10. FIG. 2 schematically illustrates the symmetrical placement of five insert pockets, with the insert seat and wedge assembly of the subject invention being illustrated in detail at two of the five locations.

Generally, the insert seat and wedge assembly of the subject invention includes an insert seat 20, an insert 22 and a wedge 24. The radial position of the cutting edges 26 of the inserts 22 defines the effective outer diameter of the boring cutter, illustrated by the dotted line B in FIG. 2. In accordance with the subject invention, a standard four inch diameter boring cutter can be readily adjusted to have an effective outer diameter from 3.875 inches to 4.125 inches. The boring cutter 10 includes chip removal recesses 28 associated with each insert pocket 14 to facilitate the clearing of metal particles which have been removed by the cutting insert.

Figure 1:
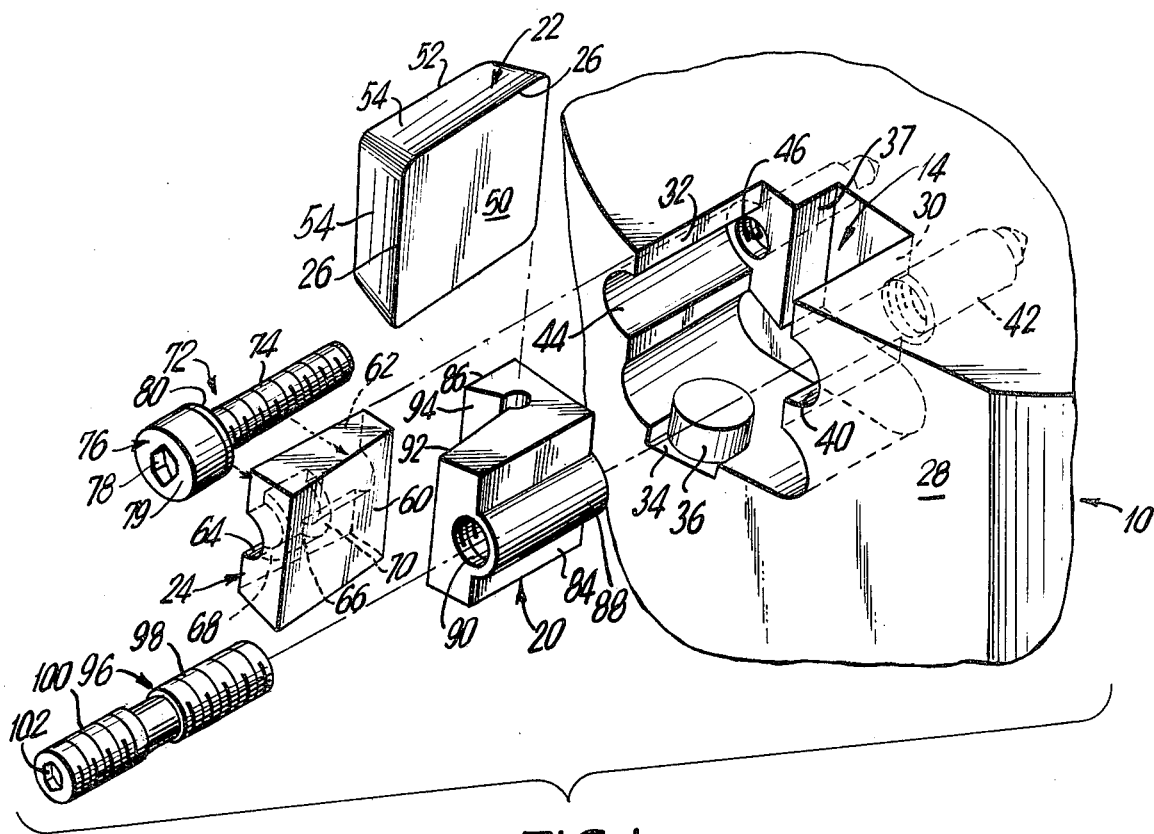
FIG. 1 is an exploded perspective view of the new and improved insert seat and wedge assembly of the subject invention.

Turning now more specifically to FIG. 1, the insert pocket 14 includes parallel, opposed leading and trailing walls 30, 32. The bottom wall 34 is disposed perpendicular to both the leading and trailing walls 30, 32. A locating stud 36, which is generally cylindrical in configuration, may be affixed to the bottom wall 34 of the insert pocket to aid in fixing the axial position of the insert 22. A brace surface 37 may additionally be provided projecting from the rear of the pocket 14. The brace surface 37 provides additional support for the insert seat 20 particularly when the radial position of the insert seat is being varied.

The leading wall 30 of the insert pocket 14 is provided with a longitudinally extending semi-circular recess 40. In addition, a threaded aperture 42 is provided in the body of the boring cutter 10. Preferably, the central axis of the threaded aperture 42 coincides with the central axis of the semi-circular recess 40. A second semi-circular recess 44 is provided in the trailing wall 34 adjacent another threaded aperture 46 formed in the body of the boring cutter 10, with the central axis of the threaded aperture 46 being coincident with the central axis of the recess 44. The recesses 40, 44, as well as the threaded apertures 42, 46, are adapted to receive the insert seat 20 and screws of the wedge assembly, as more fully described hereinafter.

The new and improved insert seat and wedge assembly of the subject invention is intended to locate and secure a conventional indexable insert 22. The insert 22 is provided with front and rear planar surfaces 50, 52 and has a plurality of edge faces 54 disposed therebetween. Each insert 22 is generally formed of a hardened tungsten carbide material and usually are ¾ of an inch in size. The insert 22 is symmetrically formed and includes a plurality of cutting edges 26 which are defined by the line of meeting between each edge face 54 and the front surface 50 of the insert. By providing a plurality of cutting edges, when the active cutting edge 26 becomes worn, the insert may be rotated to expose a fresh cutting edge. As seen more specifically in FIG. 4, the illustrated insert 22 is of the type referred to as "positively cleared", wherein the edge faces 54 slope away from the front surface 50 at an angle less than 90°. By this arrangement, clearance will be provided along the edge face 54 when the insert is disposed at its desired rake angle.

In order to securely lock the insert 22 in the pocket 14 of the boring cutter, a wedge 24 is provided which is adapted to interfit between the trailing wall 32 of the pocket and the rear surface 52 of the insert. The wedge 24, which is generally made from steel, is provided with opposed leading and trailing surfaces 60 and 62. As more clearly illustrated in FIG. 4, the leading surface 60 is disposed at an angle relative to the trailing surface 62 to provide the wedge-like action necessary to lock the insert 22 in place. The trailing surface of the wedge 62 is provided with a longitudinally extending recess 64 having a major diameter portion 66 disposed intermediate the length of the recess 64. By this arrangement, a pair of opposed semi-circular rims 68, 70 are defined at the juncture of the opposed ends of the major diameter portion 66 and the recess 64. Each rim 68, 70 acts as a stop or catch against the head of the rotating screw 72 as more fully described hereinafter.

To enable the radial adjustment of the wedge 24, a first screw 72 is provided which includes an elongated shaft portion 74 and a head portion 76 having a diameter larger than the shaft portion 74. The head portion 76 is provided with a non-circular recess 78 to facilitate the driving of the screw.

In use, the shaft portion 74 of screw 72 is received by the threaded aperture 46 in the boring cutter 10. Preferably, the radius of the recess 44 in the boring cutter 10 substantially corresponds to the radius of the head portion 76 of screw 72, thereby allowing the head of the screw to freely traverse therealong. Further, it is preferable that the configuration of the major diameter portion 66 in recess 64 of the wedge 24 substantially correspond to the dimensions of the head portion 76 of screw 72. By this arrangement, the head portion 76 is freely receivable within the major diameter portion 66 of the recess 64 and may rotate therein. However, movement of the screw 72 in a radial direction relative to the wedge 24 is inhibited by the rim portions 68, 70 of the recess 64. More specifically, radial movement of the screw 72 causes one of the opposed ends 79, 80 of the head portion 76 to abut against the associated rim 68, 70, thereby transmitting a force to the wedge. By this arrangement, the rotation of the screw will cause the radial movement of the wedge 24. To lock the insert in place, the screw 72 is rotated by a driver, such as an allen wrench, which is engaged in the non-circular opening 78 in the head of the screw 76. The rotation of the screw 72 in a clockwise direction will cause the screw to traverse radially inwardly as it engages in the aperture 46. The head 76 of the screw 72 will freely traverse along the recess 44 while the end 80 of the head portion 76 will abut and push on the rim portion 70 of recess 64. This inwardly directed force causes the wedge 24 to be driven radially inward to lock the insert in place, as more fully described hereinafter.

In accordance with the subject invention, a new and improved adjustable insert seat 20 is provided and includes opposed leading and trailing surfaces 84, 86. Leading surface 84 is provided with a longitudinally extending semi-circular detent 88 having a radius substantially corresponding to the radius of recess 40 in the boring cutter 10. By this arrangement, when the insert seat 20 is mounted in the pocket 14 of the boring cutter, the detent 88 is slidably receivable along the recess 40 thereby aiding in the accurate positioning of the insert seat and providing for a more secure assembly. A threaded aperture 90 is provided adjacent the leading surface 84 and it is preferred that at least a portion of the threaded aperture 90 be disposed within the detent 88. When mounted, the central longitudinal axis of the threaded aperture 90 is coincident with the central longitudinal axis of the threaded aperture 42 in the cutter body 10.

The trailing wall 86 of the new and improved insert seat of the subject invention includes an undercut portion which functions to define a side locating support 92, as well as a rear locating support 94. As viewed in FIG. 4, the insert seat 20 has a generally L-shaped configuration due to the undercut provided in the trailing surface 86. The orientation of the leading and rear locating supports 92, 94 is determined by the type of insert to be used, as well as the desired radial rake angle to be employed. More specifically, the angle defined between the side and rear locating supports 92, 94 should correspond to the angle between the front planar surface 50 and the edge faces 54 of the insert 22. By this arrangement, a secure seat for the insert 22 is provided. It is preferable that the width of the rear locating support 94 substantially correspond to the width of an edge face 54 of the insert. The angle of the leading locating support 92 relative to the radial axis of the boring cutter 10 defines the radial rake angle of the insert. In the illustrated embodiment, as viewed in FIG. 4, a negative radial rake angle is provided.

To adjust the radial position of the insert seat 20, a second screw 96 is provided having inner and outer threaded shaft portions 98 and 100. A non-circular opening 102 is provided at the outer end of screw 96 to enable the screw to be driven. In use, the inner shaft portion 98 of the screw is received in the threaded aperture 42 of the cutter 10, while the outer shaft portion 100 is received in the threaded aperture 90 in the insert seat 20. In order to convert the rotational movement of the screw 96 into the radial translational movement of the insert seat 20, the thread arrangement of the inner and outer shaft portions 98 and 100 must be different. For example, if the inner shaft portion 98 is provided with a right hand thread, the outer portion 100 must be oppositely threaded. In the alternative, if both the inner and outer shaft portions 98 and 100 have threads turning in the same direction, the number of threads per inch much be varied. For example, and in a preferred embodiment, the outer shaft portion 100 is provided with twenty threads per inch while the inner shaft portion 98 is provided with twenty-eight threads per inch. Due to the different thread arrangement of the inner and outer shaft portions of the screw 96, the rotation of the screw will cause the translational movement of the insert seat 20 in a radial direction.

Figure 4:
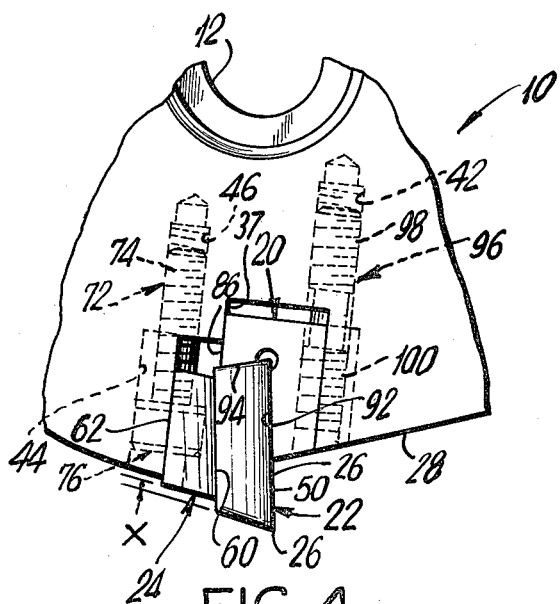
FIG. 4 is a partial top plan view of the insert seat and wedge assembly of the subject invention, illustrating the overhang between the insert and the wedge.
Figure 5:
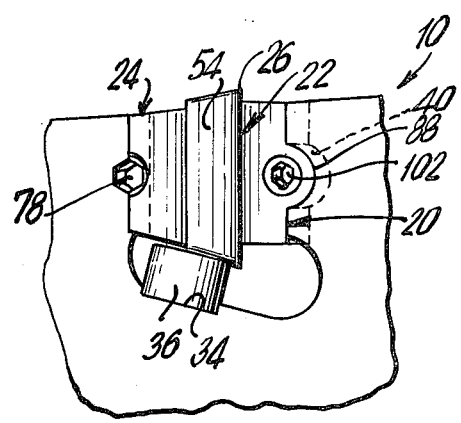
FIG. 5 is a partial side view of the insert seat and wedge assembly of the subject invention.

In accordance with the subject invention, the new and improved insert seat and wedge assembly functions to securely lock an indexable insert in a boring cutter and permits the adjustment of the outer diameter of the cutter. In addition, the arrangement functions to maintain the radial overhang between the carbide insert and the steel wedge to increase the structural rigidity of the assembly. More specifically, and as illustrated in FIGS. 4 and 5, the insert seat 20 is mounted in the pocket 14 such that the leading surface 84 abuts the leading wall 30 of the pocket, with the detent 88 being slidably received within recess 40. In addition, the trailing surface 86 abuts the brace surface 37 of the pocket 14. An insert 22 is then mounted in the insert seat 20 such that the front surface 50 abuts the leading locating support 92, while an edge face 54 abuts the rear locating support 94. The above described insert placement, with the front surface 50 and the edge face 54 flush with the locating supports 92, 94 of the insert seat functions to define the radial rake angle of the insert.

As seen more particularly in FIG. 5, the axial positioning of the insert 22 is determined by the thickness of the locating stud 36. More specifically, since an edge face 54 rests on the locating stud 36, the amount the insert projects upwardly (axially) is determined by the thickness of the stud 36. The selection of a locating stud 36 having a particular thickness depends upon the desired use of the milling cutter 10. If it is desirable to have a greater axial extension for the insert 22, a thicker locating stud is employed. The locating stud 36 may be affixed in the pocket 14 by any suitable manner such as riveting.

At this stage it is convenient to adjust the position of the insert seat 20 and hence the outer diameter of the cutting tool 10. The outer diameter is measured from the central axis of the cutter 10 to the tip of the cutting edge 26 of the insert 22. To obtain the desired outer diameter, the radial position of the insert seat 20 is changed which thereby alters the radial position of the insert 22. More specifically, screw 96 is rotated such that the radial position of the insert seat 20 is varied either inwardly or outwardly. The user continues to rotate the screw 96 until the insert 22 is properly positioned and the desired outer diameter is obtained.

Thereafter, to securely affix the position of the insert 20 within the pocket 14, wedge 24 is driven radially inward until a secure interfit is achieved between the insert 22 and the trailing wall 32 of the pocket. More specifically, as the screw 72 is initially rotated in a clockwise direction, end 80 of the head portion 76 of the screw 72 is driven against the rim 70 of recess 64. Further rotation of the screw 72 functions to inwardly push the wedge 24 into the pocket 14. In order to obtain a highly stable assembly, it is desirable that the plane of the leading surface 60 of the wedge 24 be parallel to the plane of the leading locating support 92 of the insert seat 20. By this arrangement, all the planar surfaces of the assembly will lie flush against each other thereby providing for maximum strength.

After tightening the wedge 24, a fixed overhang will be achieved between the insert 22 and the wedge 24. As illustrated in FIG. 4, the overhang "X" is defined as the distance which the insert 22 radially extends beyond the wedge 24. As noted above, the amount of overhang is critical in that if the overhang becomes large and the insert is left unsupported, the cutting edge is subject to fracture. It is desirable to have an overhang of approximately 0.03 inches when using standard ¾ inch inserts.

The tightening of wedge 24 will achieve the desired amount of overhang regardless of the radial position of the insert seat 20. This result is achieved due to the cooperation of the insert pocket 14 with the wedge 24 and insert seat 20. More specifically, and as illustrated in FIG. 4, the leading and trailing walls 30, 32 of the pocket 14 are parallel. In addition, the leading surface 60 of the wedge and the leading locating support 92 of the insert seat 20 lie in parallel planes. Thus, as the wedge 24 is forced inwardly, the location of the wedge, relative to the insert, at the point when the assembly becomes locked, remains constant regardless of the position of the insert seat 20. By this arrangement, the outer diameter of the cutter 10 can be readily adjusted without varying the amount of insert overhang "X", such that the likelihood of insert fracture is substantially reduced.

The above described steps for installing the assembly are carried out at each pocket assembly of the boring cutter 10. The boring cutter 10 may then be rotated, in a direction indicated by arrow A, as indicated in FIG. 2, enabling parts to be machined to a fixed outer diameter, as indicated by the dotted line B in FIG. 2. When the cutting edges 26 of the inserts 22 become worn, it is merely necessary to loosen the wedge 24 and index the insert exposing a fresh cutting edge. The wedge is loosened by rotating screw 72 in a counterclockwise direction. The rotation of the screw 72 forces the head of the screw into abutting relationship with the rim 68 thereby causing the wedge to move radially outwardly.

It is often desirable that a machined cut produced using the cutting tool in the above described manner, be finished or smoothed rather than leaving sharp edges or scratches in the work piece. This may be readily accomplished by substituting finishing inserts in the pockets for the standard inserts, and thereafter, slightly increasing the outer diameter of the boring cutter. This insert substitution, and subsequent set up of the outside diameter of the boring cutter is greatly facilitated when using the new and improved insert seat and wedge assembly of the subject invention.

More specifically, to substitute a finishing insert for the standard insert, the wedge 24 is loosened such that the insert 22 may be readily removed and replaced with a conventional finishing insert, having the same overall dimensions as the standard insert 22. To increase the outer diameter of the boring cutter 10, the screw 96 is rotated to outwardly shift the radial position of the insert seat 20 the desired amount. Thereafter, the wedge 24 is retightened by rotating screw 72 in the clockwise direction until the finishing insert is securely clamped. As noted above, due to the cooperation of the insert pocket 14 with the insert seat 20 and the wedge 24, a 0.03 inch overhang of the insert relative to the wedge will be maintained. The cutter 10 may then be used to finish or smooth the surface of the cut.

In summary, there is provided a new and improved insert seat and wedge assembly for use in a boring cutter. The boring cutter, which is circular and is adapted to be rotated about its central axis is provided with at least one pocket disposed at and opening out of the periphery of the cutter. The pocket is provided with opposed parallel leading and trailing walls and includes a bottom wall disposed perpendicular thereto. An insert seat having a generally L-shaped configuration is provided which includes leading and rear locating support portions which are adapted to receive an indexable insert. A screw means is provided for readily adjusting the radial position of the insert seat. By this arrangement, the radial position of the insert can be adjusted such that the desired outer diameter of the boring cutter may be readily achieved. A wedge is provided which is receivable within the insert pocket to securely affix the insert within the pocket. Due to the cooperation of the insert pocket with the wedge and insert seat, a constant overhang is maintained between the insert and the wedge regardless of the radial position of the insert seat and insert. The wedge thereby provides sufficient support for the insert such that the likelihood of the insert fracturing during a cutting operation is substantially reduced.

While the invention has been described with reference to a specific embodiment, it is obvious that there may be variations which properly fall within the scope of the invention. Accordingly, the invention should be limited in scope only as may be necessitated by the scope of the appended claims.

I claim:

1. An adjustable insert seat and wedge assembly for an indexable cutting tool, said cutting tool being generally circular and adapted to be rotated about its central axis, said cutting tool having at least one pocket disposed at an opening of the periphery thereof, said pocket having opposed parallel leading and trailing walls, said pocket further including a bottom wall disposed perpendicular to said leading and trailing walls, and wherein said insert seat and wedge assembly comprises:

a wedge means having leading and trailing planar surfaces, with said leading surface being disposed at an angle relative to said trailing surface, and with said trailing surface of said wedge means being disposed in abutting relationship with said trailing wall of said pocket of the cutting tool;

first screw means engaged with said wedge means and said cutting tool such that when said screw means is rotated, the radial location of said wedge means relative to the central axis of said cutting tool is varied;

an indexable insert having front and rear planar surfaces and a plurality of edge faces disposed therebetween;

an insert seat having opposed leading and trailing surfaces, with the leading surface of said insert seat being disposed in abutting relationship with the leading wall of said pocket, and with the trailing surface of said insert seat having an undercut portion such that said insert seat is generally L-shaped in configuration, said undercut defining planar leading and rear locating supports, and wherein said insert is receivable in said insert seat with the front surface of said insert abutting the leading locating support of said insert seat, with one edge face of said insert abutting the rear locating support of said insert seat and with another edge face of said insert abutting the bottom wall of said pocket of said cutting tool, and with the leading locating support of said insert being disposed at an angle relative to the leading surface of said insert seat with the angular disposition between the leading locating support of said insert seat and the leading surface of said insert seat equaling the angular disposition between the leading and trailing surfaces of said wedge means, and wherein the leading surface of said wedge means abuts the rear surface of said insert, and with said trailing planar surface of said wedge means being parallel to said leading surface of said insert seat, and with said leading planar surface of said wedge means being parallel to said leading locating support of said insert seat, thereby enabling the locking of said insert in place; and second screw means threadably engaged with said insert seat and said cutting tool such that when said second screw means is rotated the radial location of said insert seat relative to the central axis of said cutting tool is varied, whereby the radial position of said insert seat may be varied by adjusting said first and second screw means.

2. An insert seat and wedge assembly as recited in claim 1 wherein the width of said rear locating support is substantially equal to the width of the edge faces of said insert.

3. An insert seat and wedge assembly as recited in claim 1 wherein said leading surface of said insert seat includes a longitudinally extending semi-circular detent, and wherein the leading wall of said pocket further includes a longitudinally extending semi-circular recess, said recess being a mirror image of said detent of said insert seat, said detent being slidably engaged with said recess such that the rigidity of said assembly is increased.

4. An insert seat and wedge assembly as recited in claim 4 wherein said insert seat further includes a threaded aperture capable of receiving said second screw means, said threaded aperture being at least partially formed in said detent of said insert seat.

5. An insert seat and wedge assembly as recited in claim 1 wherein said second screw means comprises an elongated, cylindrical shaft with the portion of said shaft which is threadably engaged with said insert seat having a thread arrangement different from the thread arrangement of the portion of said shaft which is threadably engaged with said cutting tool.

6. An insert seat and wedge assembly as recited in claim 1 wherein said first screw means includes a cylindrical shaft portion and a cylindrical heat portion, with said shaft portion having a diameter less than the diameter of said head portion.

7. An insert seat and wedge assembly as recited in claim 6 wherein said trailing surface of said wedge includes a longitudinally extending semi-circular recess, said recess having a major diameter portion, said major diameter portion being disposed intermediate the length of said recess and having a radius substantially corresponding to the radius of the head portion of said first screw means, said major diameter portion being adapted to receive said head portion of said first screw means, and with the radius of the remaining portion of said recess substantially corresponding to the radius of said shaft portion of said first screw means such that a pair of opposed rims are defined at the junctures between the ends of the major diameter portion and the recess; and wherein said trailing wall of said pocket includes longitudinally extending semi-circular recess having a radius substantially corresponding to the radius of the head portion of said screw means such that said head portion of said first screw means is slidably receivable within said recess in said trailing wall of said pocket, whereby when said first screw means is rotated, the head portion thereof abuts one of said rims such that a radially directed force is placed on said wedge to thereby alter the radial position of said wedge.

8. An insert seat and wedge assembly as recited in claim 1 further including a locating stud, said locating stud being affixed to the bottom wall of said pocket of said cutting tool, said locating stud being in abutting relationship with said another edge face of said insert.

9. An insert seat and wedge assembly as recited in claim 8 wherein said locating stud is generally cylindrical in configuration.

* * * * *

UNITED STATES PATENT AND TRADEMARK OFFICE
CERTIFICATE OF CORRECTION

PATENT NO. : 4,318,647

DATED : March 9, 1982

INVENTOR(S) : Donald S. Erkfritz

It is certified that error appears in the above—identified patent and that said Letters Patent is hereby corrected as shown below:

Column 9, line 54, after "insert" put --seat--.

Column 10, line 33, delete "heat" and substitute therefor --head--.

Signed and Sealed this

Twenty-fifth Day of May 1982

[SEAL]

Attest:

Attesting Officer

GERALD J. MOSSINGHOFF

Commissioner of Patents and Trademarks